US009727265B2

(12) United States Patent
Kawakami et al.

(10) Patent No.: US 9,727,265 B2
(45) Date of Patent: Aug. 8, 2017

(54) DISK DEVICE AND CONTROL METHOD THAT CONTROLS AMOUNT OF DATA STORED IN BUFFER

(71) Applicant: Kabushiki Kaisha Toshiba, Minato-ku, Tokyo (JP)

(72) Inventors: Izumi Kawakami, Yokohama Kanagawa (JP); Hiroaki Inoue, Yokohama Kanagawa (JP); Akio Mizuno, Ome Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/847,493

(22) Filed: Sep. 8, 2015

(65) Prior Publication Data
US 2016/0378385 A1    Dec. 29, 2016

Related U.S. Application Data

(60) Provisional application No. 62/183,290, filed on Jun. 23, 2015.

(51) Int. Cl.
G06F 3/06 (2006.01)
(52) U.S. Cl.
CPC ............ *G06F 3/0625* (2013.01); *G06F 3/068* (2013.01); *G06F 3/0619* (2013.01); *G06F 3/0665* (2013.01)

(58) Field of Classification Search
None
See application file for complete search history.

(56) References Cited

U.S. PATENT DOCUMENTS

| 5,696,775 | A | 12/1997 | Nemazie et al. |
| 6,418,510 | B1 | 7/2002 | Lamberts |
| 7,818,494 | B2* | 10/2010 | Inoue ............ G06F 3/061 |
| | | | 360/75 |
| 8,281,095 | B2 | 10/2012 | Chen et al. |
| 8,498,966 | B1 | 7/2013 | Waghole |
| 2006/0069870 | A1 | 3/2006 | Nicholson et al. |
| 2008/0046660 | A1* | 2/2008 | Takai ............ G06F 12/0871 |
| | | | 711/137 |

(Continued)

FOREIGN PATENT DOCUMENTS

JP    4557341 B2    10/2010

OTHER PUBLICATIONS

Non-Final Office Action received in U.S. Appl. No. 14/687,274 dated Nov. 18, 2016.

*Primary Examiner* — Edward Dudek, Jr.
*Assistant Examiner* — Ralph A Verderamo, III
(74) *Attorney, Agent, or Firm* — White & Case LLP

(57) ABSTRACT

According to one embodiment, a magnetic disk device includes a disk including a first region and a second region, a head configured to record write data to the disk, a buffer configured to store the write data up to a first capacity, and a controller configured to obtain a first processing amount based on a time to save the write data to the first region by the head and a second processing amount improved by saving the write data from the buffer to the first region, compare the first processing amount with the second processing amount, and determine whether the write data should be saved to the first region, based on a result of the comparison between the first processing amount and the second processing amount.

18 Claims, 6 Drawing Sheets

(56) References Cited

U.S. PATENT DOCUMENTS

| | | | |
|---|---|---|---|
| 2009/0198931 A1 | 8/2009 | Ohyama et al. | |
| 2011/0191534 A1* | 8/2011 | Ash | G06F 12/0804 711/113 |
| 2013/0132667 A1* | 5/2013 | Benhase | G06F 12/0802 711/113 |
| 2014/0122793 A1* | 5/2014 | Inoue | G06F 3/0676 711/112 |
| 2016/0306697 A1 | 10/2016 | Adachi et al. | |

* cited by examiner

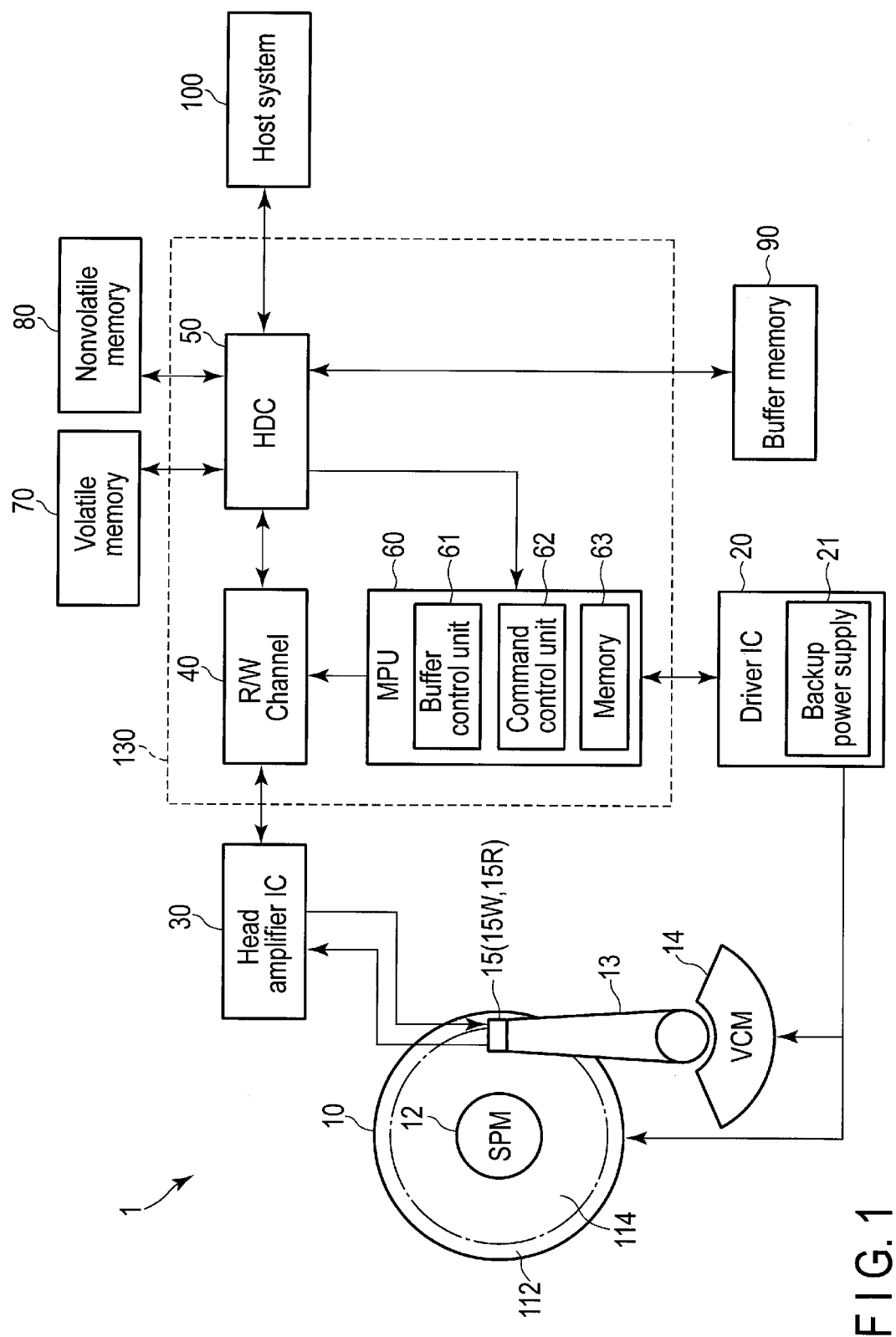
F I G. 1

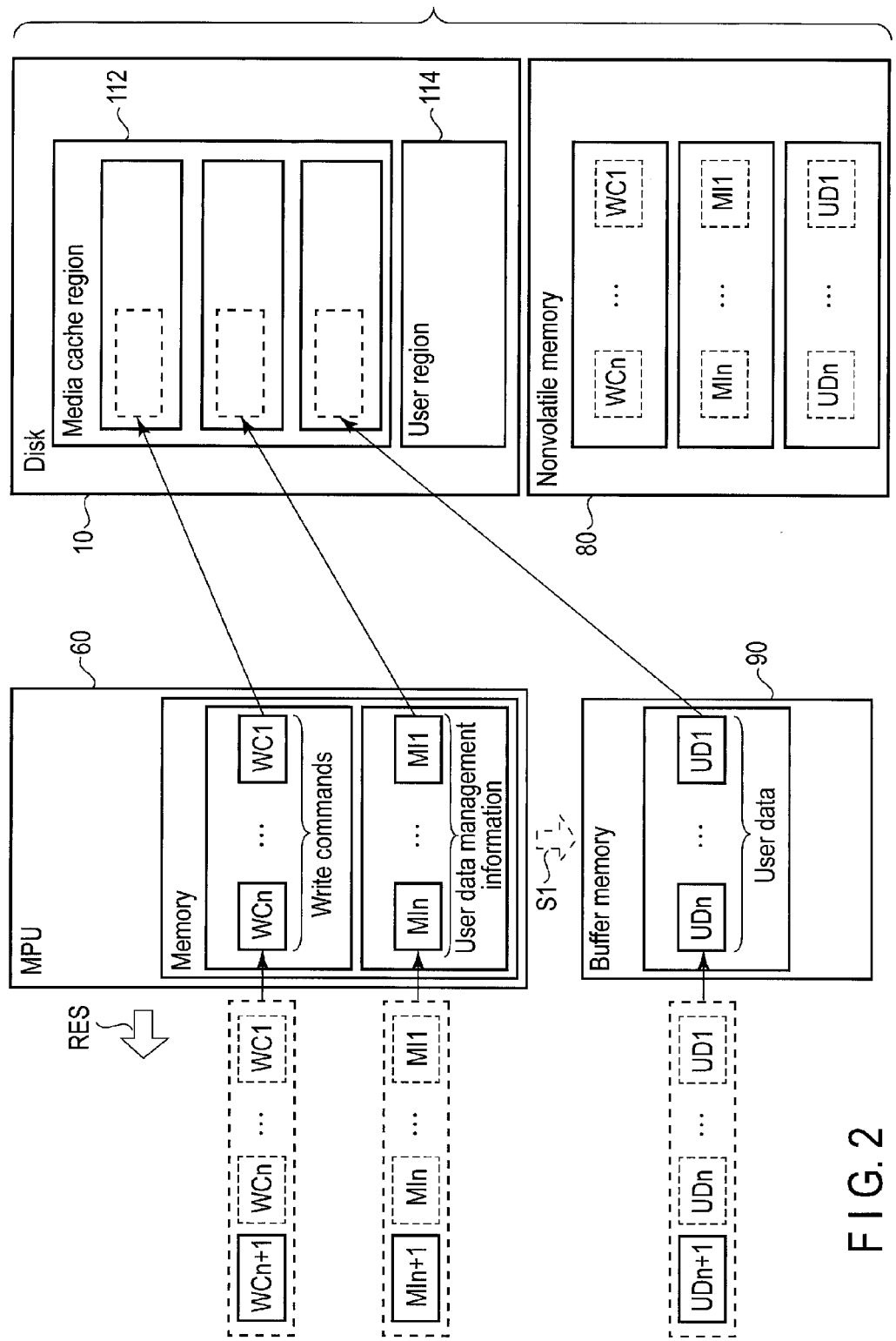
F I G. 2

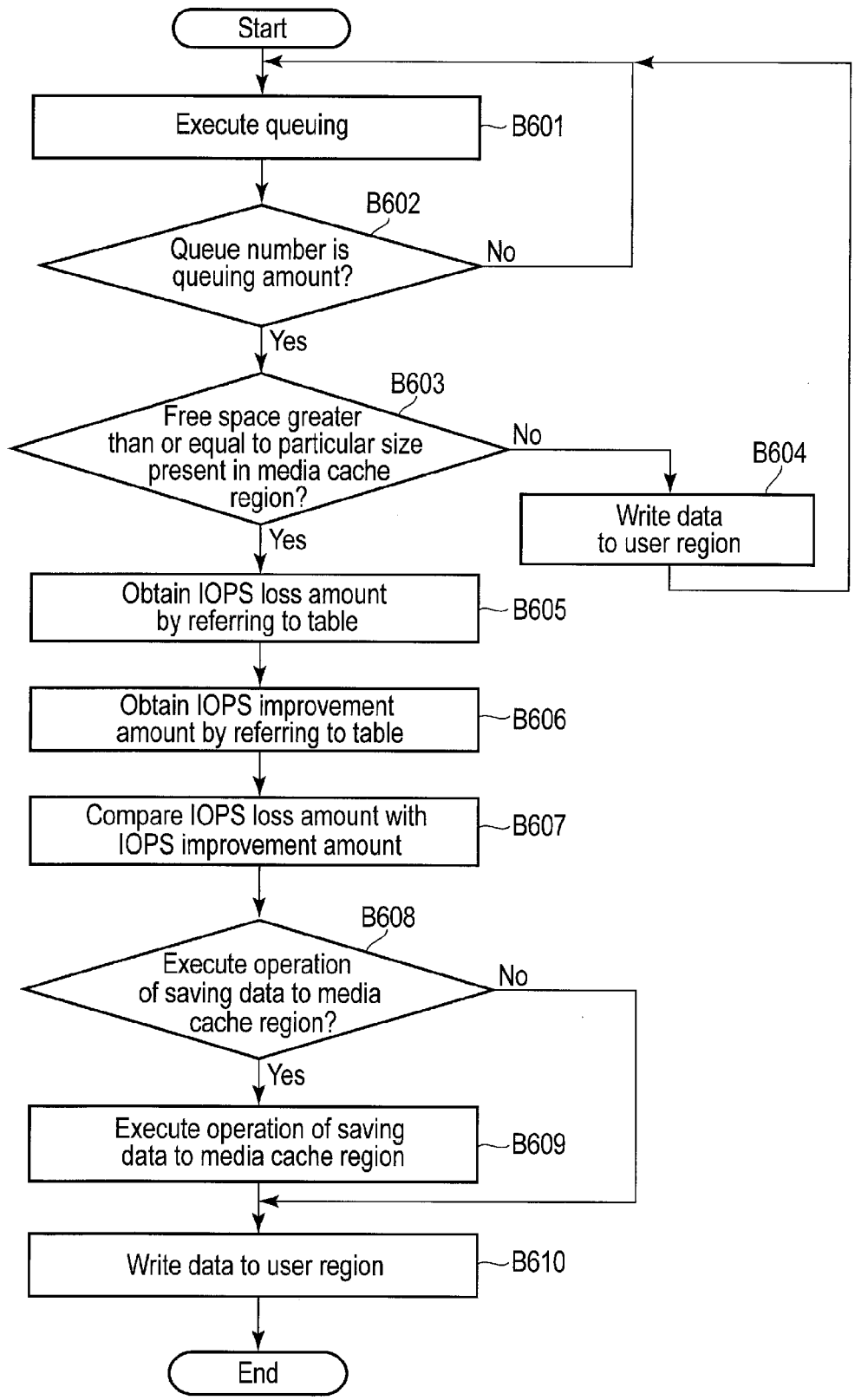
F I G. 6

DISK DEVICE AND CONTROL METHOD THAT CONTROLS AMOUNT OF DATA STORED IN BUFFER

CROSS-REFERENCE TO RELATED APPLICATIONS

This application claims the benefit of U.S. Provisional Application No. 62/183,290, filed Jun. 23, 2015, the entire contents of which are incorporated herein by reference.

FIELD

Embodiments described herein relate generally to a magnetic disk device and a control method.

BACKGROUND

Recently, a magnetic disk device includes a power loss protection (PLP) function of assuring write data that is not written to a disk (i.e., unwritten data) by saving (or caching) write data to an nonvolatile memory, etc., in a case where a failure unexpectedly occurs in a main power supply. The PLP function includes a function of saving unwritten data cached in a volatile memory, etc., and management information of the unwritten data, to the nonvolatile memory, etc., in the case where the failure occurs in the main power supply. Such an operation is often referred to as a PLP saving operation. When the main power supply is recovered, a magnetic disk device can restore the unwritten data saved to the nonvolatile memory, etc., by the PLP saving operation, to the volatile memory, based on the management information.

In addition, the magnetic disk device can queue a write command from a host system, in a general write operation, by saving the write data to the nonvolatile memory, etc., by the PLP function. In other words, the magnetic disk device can assure the unwritten data in a case where the failure occurs in the main power supply, even in a state of invalidating the write cache, and efficiently writing the write data to a disk, similarly to a case of validating the write cache, by the PLP function. The magnetic disk device can increase an amount (i.e., queuing amount) of the write commands which can be queued, in accordance with the data amount (i.e., PLP amount) which can be assured by the PLP function. The PLP amount depends on the capacity of the nonvolatile memory, etc. Furthermore, the PLP amount can be virtually increased by forming a media cache area in a disk and saving the write data to the media cache area.

BRIEF DESCRIPTION OF THE DRAWINGS

FIG. 1 is a block diagram showing a structure of a magnetic disk device of a first embodiment.

FIG. 2 is an illustration showing an example of a write data saving operation at the magnetic disk device of the first embodiment.

FIG. 6 is a flowchart showing an example of write operation processing in the magnetic disk device of the first embodiment.

DETAILED DESCRIPTION

Figure 3:
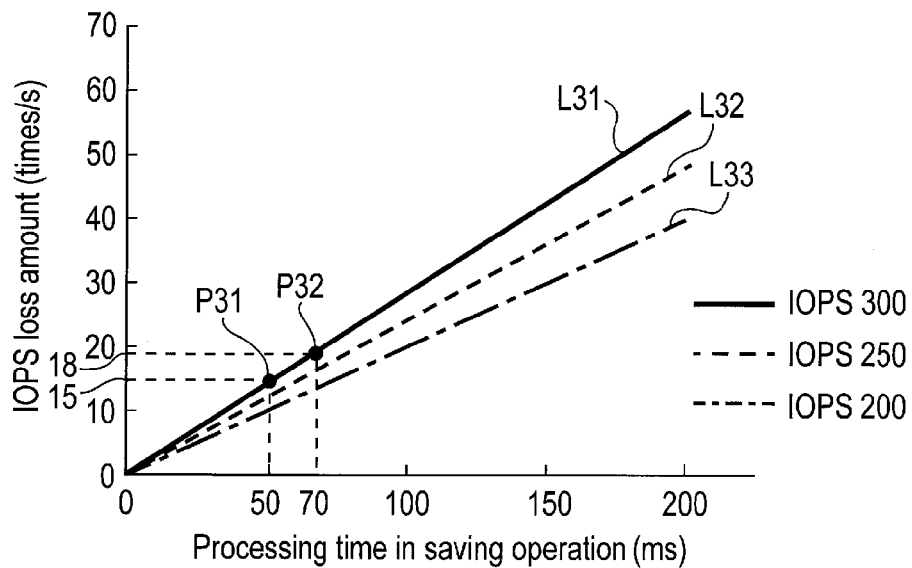
FIG. 3 is a graph showing an example of a table indicating a relationship between a processing time and an IOPS loss amount, in the write data saving operation.

In general, according to one embodiment, a magnetic disk device comprises: a disk comprising a first region and a second region; a head configured to record write data to the disk; a buffer configured to store the write data input from outside up to a first capacity; and a controller configured to obtain a first processing amount based on a time to save the write data to the first region by the head and a second processing amount improved by saving the write data from the buffer to the first region, compare the first processing amount with the second processing amount, and determine whether the write data should be saved to the first region, based on a result of the comparison between the first processing amount and the second processing amount.

Embodiments will be described hereinafter with reference to the accompanying drawings.

First Embodiment

FIG. 1 is a block diagram showing a structure of a magnetic disk device 1 of a first embodiment.

The magnetic disk device 1 includes a head-disk assembly (HDA) which will be explained later, a driver IC 20, a head amplifier integrated circuit (hereinafter called a head amplifier IC) 30, a volatile memory 70, a nonvolatile memory 80, a buffer memory (buffer) 90, and a system controller 130 composed of a single-chip integrated circuit. In addition, the magnetic disk device 1 is connected with a host system (host) 100.

The HDA includes a magnetic disk (hereinafter called a disk) 10, a spindle motor (SPM) 12, an arm 13 equipped with a head 15, and a voice coil motor (VCM) 14. The disk 10 includes a media cache area 112 (first area) provided on an outer side of the disk and a user area 114 (second area) provided on a side inner than the media cache area 112. The disk 10 is rotated by the spindle motor 12. The arm 13 and the VCM 14 constitute an actuator. The actuator is driven by the VCM 14 to control movement of the head 15 mounted on the arm 13 to a particular position on the disk 10. At least one disk 10 and at least one head 15 may be provided.

The head 15 is provided on a slider which is a main body, and includes a write head 15W and a read head 15R mounted on the slider. The read head 15R reads data recorded on a data track on the disk 10. The write head 15W writes (records) data to the disk 10.

The driver IC 20 controls driving the SPM 12 and the VCM 14 under control of a system controller 130 (more specifically, MPU 60 to be explained later). The driver IC 20 includes, for example, a backup power supply 21. It should be noted that a part, for example, a rectifier circuit, of the backup power supply 21 may be provided outside the driver IC 20.

When the power supplied from the power supply (hereinafter called a main power supply) of the magnetic disk device 1 is shut out or decreases (i.e., when a failure occurs in the main power supply), the backup power supply 21 supplies power required to maintain the minimum required operation of the magnetic disk device 1. At this time, the backup power supply 21 supplies the power to at least the system controller 130. The backup power supply 21 uses a back electromotive force of the SPM 12 to generate the supply power. The backup power supply 21 may use a capacitor charged by the main power supply to generate the supply power.

The head amplifier IC 30 includes a read amplifier and a write driver. The read amplifier amplifies a read signal which is read by the read head 15R, and transmits the read signal to a read/write (R/W) channel 40. In contrast, the write driver transmits a write current corresponding to the write data (data) output from the R/W channel 40 to the write head 15W.

The volatile memory 70 is a semiconductor memory where the stored data is lost when power supply is cut off. The volatile memory 70 stores data necessary for processing in each portion of the magnetic disk device 1. The volatile memory 70 is, for example, a synchronous dynamic random access memory (SDRAM).

The nonvolatile memory 80 is a semiconductor memory where the stored data is held even if power supply is cut off. The nonvolatile memory 80 is, for example, a flash read-only memory (flash ROM: FROM).

The buffer memory 90 is a semiconductor memory which stores the data, etc., transmitted and received between the disk 10 and the host system 100. The buffer memory 90 may be constituted integrally with the volatile memory 70. The buffer memory 90 is, for example, a dynamic random access memory (DRAM), an SDRAM, a ferromagnetic random access memory (feRAM), a magnetoresistive random access memory (MRAM), etc.

The system controller 130 is implemented by using a large scale integrated circuit (LSI) referred to as a system-on-a-chip (SOC) that a plurality of elements are integrated on a single chip. The system controller 130 includes the R/W channel 40, a hard disk controller (HDC) (controller) 50, and a microprocessor (MPU) 60.

The R/W channel 40 executes signal processing of the read data and the write data.

The HDC 50 controls data transfer between the host system 100 and the R/W channel 40 in response to an instruction from the MPU 60.

The MPU 60 is a main controller which controls each of portions of the magnetic disk device 1. The MPU 60 controls the VCM 14 via the driver IC 20 and executes servo control for positioning the head 15. In addition, the MPU 60 controls the operation of writing the write data to the disk 10 and executes control of selecting a storage destination of the write data transferred from the host system 100. Furthermore, if a failure occurs in the main power supply, the MPU 60 receives the power temporarily supplied from the backup power supply 21 and executes the minimum required operation. The minimum required operation includes, for example, an operation of retreating the head 15 to a position remote from the disk 10 and an operation of temporarily writing (saving or caching) the data by the PLP function. The MPU 60 executes an operation of restoring the data when the main power supply is recovered.

The MPU 60 includes a buffer controller 61, a command controller 62, and a memory 63. The MPU 60 executes the processing of these modules by firmware.

The buffer controller 61 controls transmission of the data to the buffer memory 90 and reception of the data from the buffer memory 90. The buffer controller 61 temporarily stores, for example, read data which is read from the disk 10, write data which is to be written to the disk 10, and other data, in the buffer memory 90.

The command controller 62 controls the write command or read command received from the host system 100.

The memory 63 is a volatile memory such as a static RAM (SRAM) and a dynamic RAM (DRAM). At least a part of the control program is loaded into a part of the storage area in the memory 63 from the disk 10 when, for example, the main power supply for the magnetic disk device 1 is turned on.

The magnetic disk device 1 configured as explained above includes a function of notifying the host system 100 of completion of the write processing corresponding to the write command even if the write processing is actually uncompleted when the write data transferred from the host system 100 is received, and managing the write data of which write processing is actually uncompleted (hereinafter called unwritten data). Such a function of managing the unwritten data is often called, for example, a persistent write cache (PWC) function. When the power supplied from the main power supply is unexpectedly shut out or decreases (i.e., when a failure occurs in the main power supply), the magnetic disk device 1 can save the unwritten data stored in the buffer, for example, buffer memory 90 to a nonvolatile recording medium, for example, the nonvolatile memory 80 by the function of managing the unwritten data. For example, if a failure occurs in the main power supply during transfer of the write data, the magnetic disk device 1 saves the unwritten data in the buffer memory 90, to the nonvolatile memory 80, with the power supplied by the power loss protection (PLP) function. The magnetic disk device 1 can restore the unwritten data saved to the nonvolatile memory 80, to the buffer memory 90, when the main power supply is recovered. Thus, when a failure unexpectedly occurs in the main power supply, the magnetic disk device 1 can assure the unwritten data by the PLP function. The amount of the unwritten data which can be assured at the magnetic disk device 1 by the PLP function is hereinafter called the PLP amount.

Furthermore, the magnetic disk device 1 can execute the cache processing by saving the write data to the media cache area 112, by the function of managing the unwritten data (for example, PWC function), in the write operation. At this time, since the magnetic disk device 1 can save the unwritten data to the media cache area 112, in the write operation, the magnetic disk device 1 can virtually increase the PLP amount. The PLP amount is virtually increased in size of the write data which can be saved to the media cache area 112.

(Saving Operation in Magnetic Disk)

The operation of saving the write data in the write operation at the magnetic disk device 1 will be hereinafter explained.

FIG. 2 is an illustration showing an example of the write data saving operation at the magnetic disk device 1. In FIG. 2, write commands WC1 to WCn+1 indicate write commands from the host 100. User data elements UD1 to UDn+1 indicate write data elements which correspond to the write commands WC1 to WCn+1, respectively. User data management information elements MI1 to MIn+1 indicate management information elements of the user data elements UD1 to UDn+1 which correspond to the write commands WC1 to WCn+1, respectively. For example, the user data management information elements MI1 to MIn+1 include logical block addresses (LBA) corresponding to the user data elements UD1 to UDn+1, respectively, the number of data blocks, and other data. It should be noted that the user data management information elements MI1 to MIn+1 are also used when the write commands WC1 to WCn+1 and the user data elements UD1 to UDn+1 saved to the nonvolatile memory 80 are restored. A response signal RES indicates a response signal to a request from the host 100. An instruction signal S1 indicates an instruction signal from the MPU 60 to the buffer memory 90.

The write commands WC1 to WCn+1, the user data elements UD1 to UDn+1, and the user data management information elements MI1 to MIn+1 are sequential values and are transferred from the host 100 in the order from 1 to n+1. The whole data elements saved to the media cache area 112, for example, the write commands WC1 to WCn+1, the user data elements UD1 to UDn+1, the user data management information elements MI1 to MIn+1, and other data, are often hereinafter called the write data.

FIG. 2 indicates that the write commands WC1 to WCn and the user data management information MI1 to MIn are stored in the memory 63 of the CPU 60 and that the user data elements UD1 to UDn is stored in the buffer memory 90. Furthermore, in FIG. 2, the write data elements (write command WCn+1, user data management information MIn+1, and user data UDn+1) subsequent to the write data elements (write command Wn, user data management information MIn, and user data UDn) are transferred from the host 100.

In FIG. 2, the write data elements (write commands WC1 to WCn, user data management information elements MI1 to Mn, and user data elements UD1 to UDn) that can be saved to the nonvolatile memory 80 are represented dotted lines. In other words, the size of the write data of the nonvolatile memory 80 indicates the size of the write data which can be saved to the nonvolatile memory 80. For example, the MPU 60 stores the write commands WC1 to WCn and the user data management information elements MI1 to MIn of the size which enables the commands and information to be saved to the nonvolatile memory 80 so as to enable the write data to be assured when a failure occurs in the main power supply. The buffer memory 90 stores the user data elements (UD1 to UDn) of the same size as the size of the data which can be saved to the nonvolatile memory 80.

If the MPU 60 receives the write commands WC1 to WCn from the host 100, the MPU 60 registers the write commands WC1 to WCn in a wait queue in the order in which the write commands WC1 to WCn are transferred from the host 100.

In addition, the MPU 60 also stores user data management information elements MI1 to MIn in the memory 63 in the order in which elements of the information are transferred from the host 100.

Furthermore, the MPU 60 temporarily stores the user data elements UD1 to UDn corresponding to the received write commands WC1 to WCn in the buffer memory 90 in the order in which the user data elements UD1 to UDn are transferred from the host 100.

If the number (queue number) of queued write commands (write data) reaches the amount (queuing amount) of the write commands which can be queued, the MPU 60 processes the write commands in the order in which the write data can be efficiently written. The queuing amount is varied based on, for example, free space of the buffer memory 90, the size of the write data which can be saved to the nonvolatile memory 80.

The MPU 60 increases the free space of the buffer memory 90 by processing the write commands WC1 to WCn received from the host 100 and saving the write data to the media cache area 112. Since the queuing amount is virtually increased at this time, the MPU 60 can further receive a next write command WCn+1 (user data UDn+1) from the host 100.

While the MPU 60 is saving the write data to the media cache area 112, the MPU 60 cannot write (record) the write data to the user area 114. Thus, when the MPU 60 processes the write commands, the MPU 60 determines whether the write data should be saved to the media cache area 112 or the write data should be written to the user area 114. In this case, the MPU 60 determines whether the write data should be saved to the media cache area 112, based on the processing performance of the write operation, for example, a value called Input Output Per Second (IOPS). The IOPS indicates the times (number of commands) of read/write processing which can be executed per one second. The IOPS value is varied depending on conditions for processing operations such as the read operation, the write operation, the sequential access, and the random access, and HDD products.

When the MPU 60 determines whether the write data should be saved to the media cache area 112, the MPU 60 acquires the IOPS amount (IOPS loss amount or first processing amount) of the write operations lost by the operation of saving the write data to the media cache area 112, and the queuing amount, i.e., the IOPS amount (IOPS improvement amount or second processing amount) of the write operation improved by increasing the free space of the buffer memory 90, by referring to several tables. The MPU 60 compares the acquired TOPS loss amount and IOPS improvement amount. If the IOPS improvement amount is greater than the IOPS loss amount, based on the comparison result, the MPU 60 saves the write data to the media cache area 112, and writes the write data saved to the media cache area 112, to the user area 114 at particular timing. If the IOPS improvement amount is smaller than the TOPS loss amount as the comparison result, the MPU 60 writes (records) the write data to the user area 114 as the general write operation. The tables may be recorded in a storage medium, for example, a system area of the disk 10, the volatile memory 70 or the nonvolatile memory 80.

An example of the tables will be explained with reference to FIG. 3 and FIG. 4.

FIG. 3 is a graph showing an example of a table indicating a relationship between a processing time and the IOPS loss amount, in the write data saving operation. In FIG. 3, a vertical axis represents the IOPS amount (IOPS loss amount) of the write operation lost by the operation of saving the data (write data) and a horizontal axis represents a processing time of the operation of saving the write data to the media cache area 112. A solid line L31 represents a relationship between the TOPS loss amount and the processing time of the operation of saving the write data, in the magnetic disk device 1 in which the IOPS is 300 (times/s). Each of point P31 and point P32 represents a point on the solid line L31. A dotted line L32 represents a relationship between the IOPS loss amount and the processing time of the operation of saving the write data, in the magnetic disk device 1 in which the IOPS is 250 (times/s). A one-dot-dashed line L33 represents a relationship between the IOPS loss amount and the processing time of the operation of saving the write data, in the magnetic disk device 1 in which the IOPS is 200 (times/s). As shown in FIG. 3, the relationship between the IOPS loss amount and the processing time of the operation of saving the write data is varied depending on IOPS, in the magnetic disk device 1.

Figure 4:
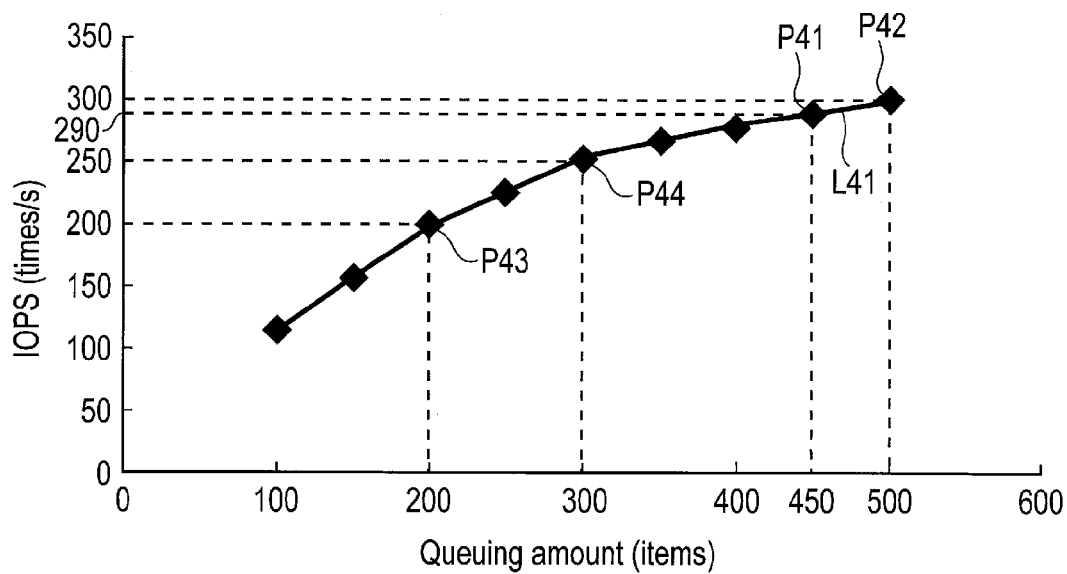
FIG. 4 is a graph showing an example of a table indicating a relationship between a queuing amount and the IOPS.

FIG. 4 is a graph showing an example of a table indicating a relationship between the queuing amount and the IOPS. In FIG. 4, a vertical axis represents IOPS and a horizontal axis represents the queuing amount. A solid line L41 represents a relationship between the queuing amount and the IOPS. Point P41, point P42, point P43 and point P44 represents points on the solid line L41, respectively.

The MPU 60 stores, for example, the table (first table) shown in FIG. 3 and the table (second table) shown in FIG. 4 in the storage medium, for example, the system area of the disk 10, the volatile memory 70 or the nonvolatile memory 80.

The MPU 60 refers to, for example, the first table and the second table shown in FIG. 3 and FIG. 4, respectively, acquires the IOPS loss amount and the IOPS improvement amount, compares the amount values, and determines whether the write data should be saved to the media cache area 112 or not in accordance with the comparison result.

(Example of Determination of Operation of Saving Write Data)

Figure 5A:
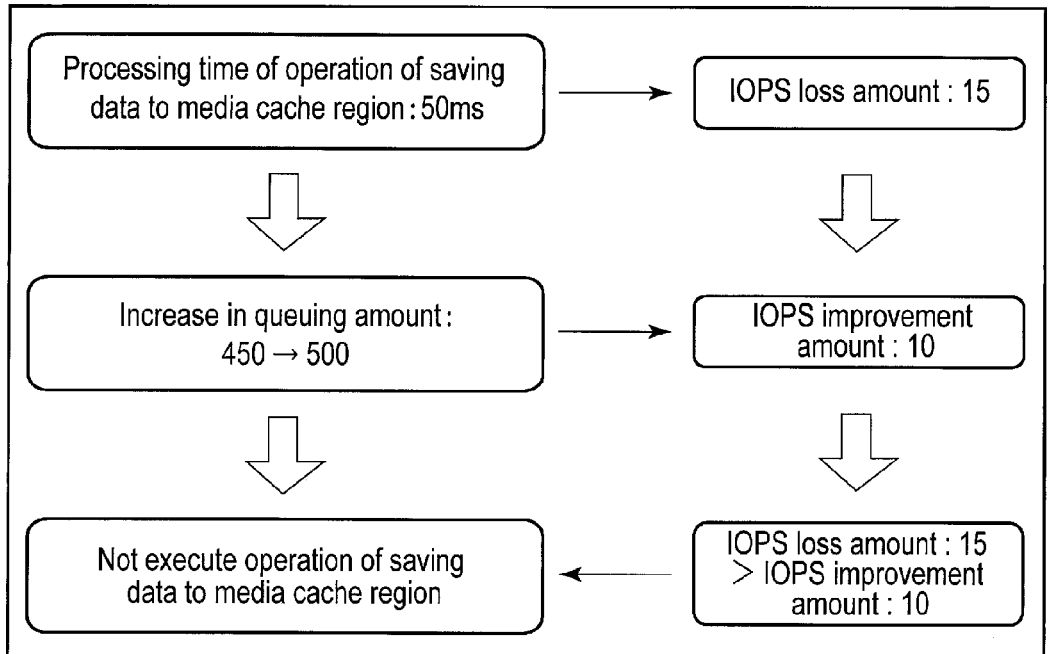
FIG. 5A is an illustration showing an example of determination of the operation of saving the write data to a media cache area.
Figure 5B:
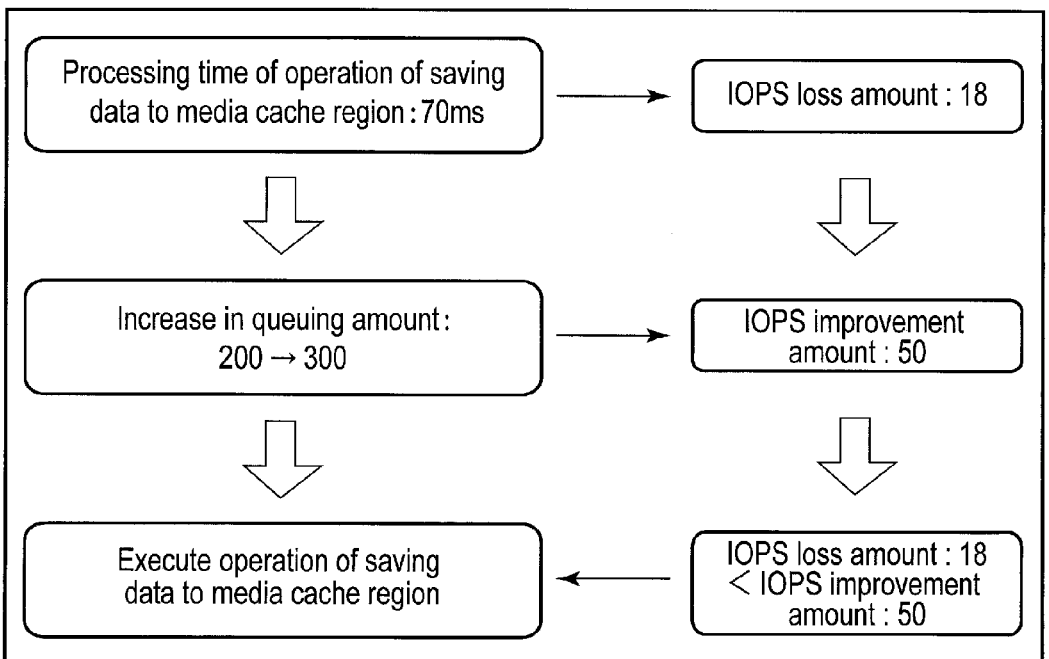
FIG. 5B is an illustration showing another example of determination of the operation of saving the write data to a media cache area.

An example of the operation of saving the write data to the media cache area 112 will be explained with reference to FIG. 5A and FIG. 5B. Each of FIG. 5A and FIG. 5B is an illustration showing an example of determination of the operation of saving the write data to the media cache area 112. In FIG. 5A and FIG. 5B, IOPS of the magnetic disk device 1 is set to be 300 (times/s). In FIG. 5A and FIG. 5B, the relationship between the processing time in the saving operation and the IOPS loss amount therefore corresponds to the solid line L31 shown in FIG. 3.

An example of not executing the operation of saving the write data will be explained with reference to FIG. 5A. In FIG. 5A, the processing time in the operation of saving the write data in the magnetic disk device 1 is 50 (ms), a theoretical increment of the queuing amount in the operation of saving the write data at this time is 100 (items), and the current queuing amount is 450 (items). It should be noted that the queuing amount of the write command that the MPU 60 can receive from the host 100 in FIG. 5A is at most 500 (items).

If the MPU 60 determines whether the write data should be saved to the media cache area 112 or not, the MPU 60 obtains the IOPS loss amount by referring to the table shown in FIG. 3 and the processing time in the operation of saving the write data. In the case shown in FIG. 5A, the processing time in the operation of saving the write data is 50 (ms) and the IOPS loss amount is 15 (times/s) as represented by point P31 shown in FIG. 3.

Next, the MPU 60 obtains the IOPS improvement amount by referring to the table shown in FIG. 4, the current queuing amount, and the queuing amount in the case where the write data is saved to the media cache area 112. Referring to FIG. 5A, since the current queuing amount is 450 (items), the current IOPS is 290 (times/s) as represented by P41 shown in FIG. 4. Since the queuing amount is at most 500 (items) in FIG. 5A, the queuing amount in the case where the write data is saved to the media cache area 112 is virtually 500 (items). The IOPS in the case where the write data is saved to the media cache area 112 is therefore 300 (times/s) as represented by P42 shown in FIG. 4. The IOPS improvement amount is 10 (times/s), based on a difference between point P41 (current IOPS) and point P42 (IOPS in the case where the write data is saved to the media cache area 112) in FIG. 4. The MPU 60 compares the IOPS loss amount at 15 (times/s) with the IOPS improvement amount at 10 (times/s). Since the IOPS improvement amount is smaller than the IOPS loss amount, based on the comparison result, the MPU 60 does not execute the operation of saving the write data to the media cache area 112, but writes the write data to the user area 114.

An example of executing the operation of saving the write data will be explained with reference to FIG. 5B. In FIG. 5B, the processing time in the operation of saving the write data in the magnetic disk device 1 is 70 (ms), a theoretical increment of the queuing amount in the operation of saving the write data at this time is 100 (items), and the current queuing amount is 200 (items). It should be noted that the queuing amount of the write command that the MPU 60 can receive from the host 100 in FIG. 5B is at most 500 (items), similarly to FIG. 5A.

If the MPU 60 determines whether the write data should be saved to the media cache area 112 or not, the MPU 60 obtains the IOPS loss amount by referring to the table shown in FIG. 3 and the processing time in the operation of saving the write data. In the case shown in FIG. 5B, the processing time in the operation of saving the write data is 70 (ms) and the IOPS loss amount is 18 (times/s) as represented by point P32 shown in FIG. 3.

Next, the MPU 60 obtains the IOPS improvement amount by referring to the table shown in FIG. 4, the current queuing amount, and the queuing amount in the case where the write data is saved to the media cache area 112. Referring to FIG. 5B, since the current queuing amount is 200 (items), the current IOPS is 200 (times/s) as represented by P43 shown in FIG. 4. The queuing amount in the case where the write data is saved to the media cache area 112 is virtually 300 (items). The IOPS in the case where the write data is saved to the media cache area 112 is therefore 250 (times/s) as represented by P44 shown in FIG. 4. The IOPS improvement amount is 50 (times/s), based on a difference between point P43 (current IOPS) and point P44 (IOPS in the case where the write data is saved to the media cache area 112) in FIG. 4. The MPU 60 compares the IOPS loss amount at 18 (times/s) with the IOPS improvement amount at 50 (times/s). Since the IOPS improvement amount is greater than the TOPS loss amount, based on the comparison result, the MPU 60 writes the write data saved to the media cache area 112 to the user area 114 at particular timing after saving the write data to the media cache area 112.

(Write Operation Processing in Magnetic Disk Device)

Next, write operation processing in the magnetic disk device 1 will be explained.

FIG. 6 is a flowchart showing an example of write operation processing in the magnetic disk device 1 of the present embodiment.

First, the MPU 60 executes queuing the write command (B601).

The MPU 60 determines whether the queue number reaches the queuing amount or not (B602).

If the MPU 60 determines that the queue number does not reach the queuing amount (No in B602), the MPU 60 returns to processing in B601. If the MPU 60 determines that the queue number reaches the queuing amount (Yes in B602), the MPU 60 determines whether a free space greater than or equal to a particular size is present in the media cache area 112 (B603). The particular size is, for example, a size of data based on the PLP amount.

If the MPU 60 determines that a free space greater than or equal to a particular size is not present in the media cache area 112 (No in B603), the MPU 60 writes (records) the write data (data) to the user area 114 as a general write operation (B604). If the MPU 60 determines that a free space greater than or equal to a particular size is present in the media cache area 112 (Yes in B603), the MPU 60 obtains the IOPS loss amount by referring to the table shown in FIG. 3 and the processing time in the operation of saving the write data to the media cache area 112 (B605).

The MPU 60 obtains the IOPS improvement amount by referring to the table shown in FIG. 4, the current queuing amount, and the queuing amount in the case where the write data is saved to the media cache area 112 (B606).

The MPU 60 compares the acquired IOPS loss amount and IOPS improvement amount (B607).

The MPU 60 determines whether the operation of saving the write data to the media cache area 112 should be executed or not, by referring to the comparison result of B607 (B608).

If the MPU 60 does not execute the operation of saving the write data to the media cache area 112 (No in B608), the MPU 60 writes the write data to the user area 114 as a general write operation (B610) and ends the processing.

If the MPU 60 executes the operation of saving the write data to the media cache area 112 (Yes in B608), the MPU 60 saves the write data to the media cache area 112 (B609).

The MPU 60 writes (records) the write data (data) saved in B609 to the user area 114 of the disk 10 at particular timing (B610) and ends the processing.

According to the present embodiment, the magnetic disk device 1 can compare the IOPS loss amount in the case where the write data is saved to the media cache area 112 with the IOPS improvement amount increased by saving the write data to the media cache area 112 and determine whether the data should be saved to the media cache area 112 or not. In other words, the magnetic disk device 1 can execute the operation of saving the data to the media cache area 112 only when the write performance is improved. Consequently, the magnetic disk device 1 can prevent degradation of the write performance in the case of caching the write data in the media cache area 112, by the function of managing unwritten data.

Next, a modified example of the magnetic disk drive of the first embodiment will be explained. In the modified example, portions like or similar to those of the above-explained first embodiment are denoted by the same reference numbers or symbols and detailed descriptions are omitted.

Modified Example

The magnetic disk device 1 of the modified example has substantially the same configuration as the first embodiment, but the write operation is selected based on a status of a free space in which the data can be written, in the media cache area 112.

A region in which the data can be written is often present in the media cache area 112. For example, after the data is saved to the media cache area 112, write to a sector of the LBA designated by the write command is not completed and the write data is often left partially in the media cache area 112.

If the write data is saved to the media cache area 112 in which the data can be partially written, the MPU 60 can select and execute a write operation excellent in write performance, based on the status of the free space in the media cache area 112.

Figure 7:
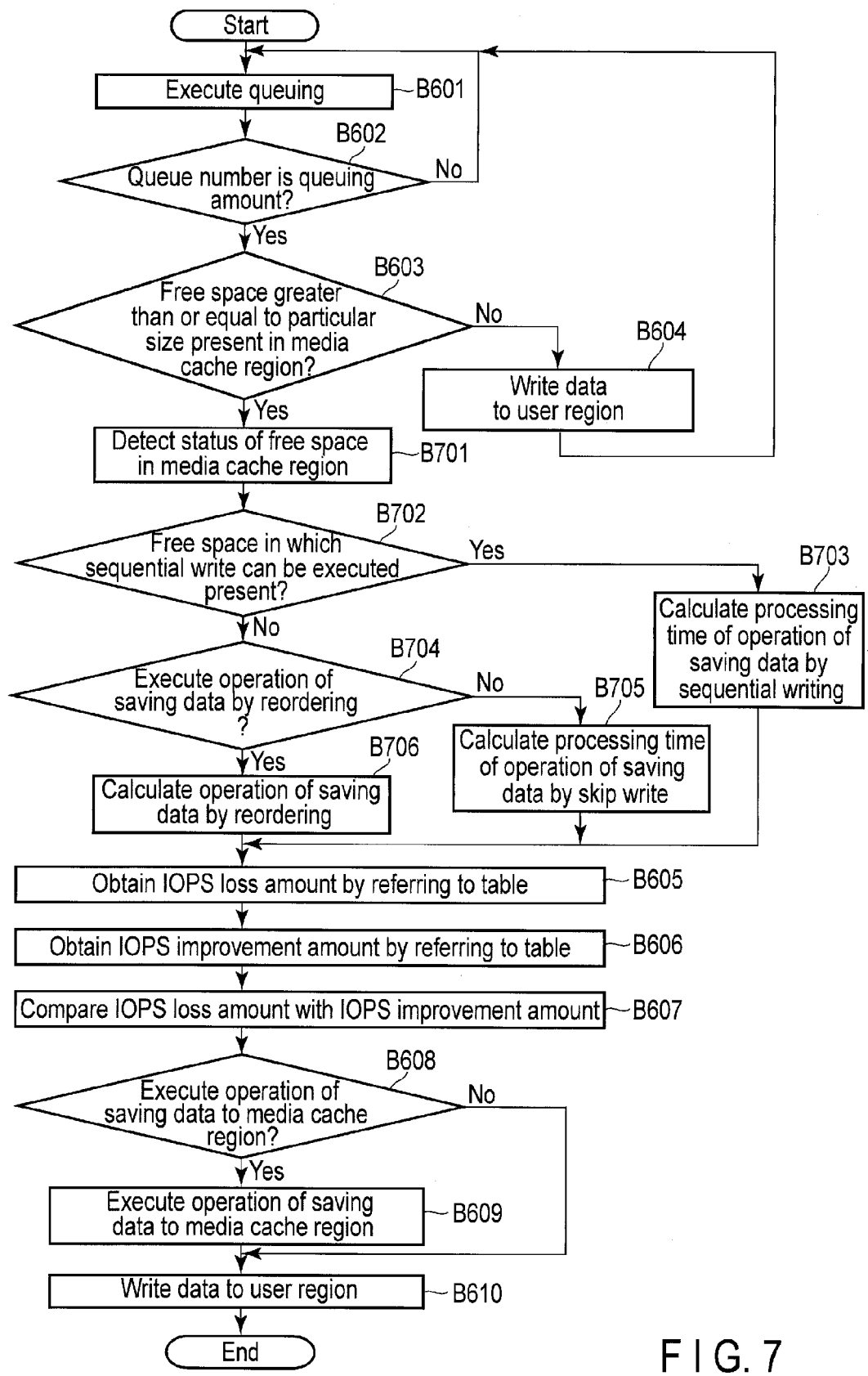
FIG. 7 is a flowchart showing an example of write operation processing in a magnetic disk device of a modified example.

FIG. 7 is a flowchart showing an example of write operation processing in the magnetic disk device 1 of the modified example. In the flowchart of FIG. 7, portions like or similar to those shown in the flowchart of FIG. 6 are denoted by the same reference numbers and symbols, and detailed explanations are omitted.

If the MPU 60 executes a particular processing block and determines that a free space of a particular size is present in the media cache area 112 (Yes in B603), the MPU 60 detects the status of the free space in the media cache area 112 (B701).

The MPU 60 determines whether a large free space in which sequential write of the write data can be executed is present in the media cache area 112 or not (B702).

If the MPU 60 determines that a free space in which sequential write can be executed is present (Yes in B702), the MPU 60 calculates the shortest processing time of the operation of saving the write data to the media cache area 112 by sequential write (B703). If the MPU 60 determines that a free space in which sequential write can be executed is not present (No in B702), the MPU 60 determines whether the operation of saving the write data by reordering should be executed or not (B704). If the free space is less than the capacity in which sequential write can be executed in the media cache area 112 and if the free space is formed in a plurality of regions disposed in an adequate interval in which write can be executed after reordering, the MPU 60 determines that the operation of saving the write data based on reordering should be executed. Reordering is a function of changing the order of writing the write data elements (processing the write commands) in accordance with a physical position of the disk so as to efficiently execute writing.

If the MPU 60 determines that the write operation based on reordering is not executed (No in B704), the MPU 60 calculates the shortest processing time of the operation of saving the write data to the media cache area 112 by skip write (B705). If the MPU 60 determines that the write operation based on reordering is executed (Yes in B704), the MPU 60 calculates the shortest processing time of the operation of saving the write data to the media cache area 112 by reordering (B706). Skip write indicates sequentially writing the write data elements on the disk 10 at particular intervals by the function of the system controller 130. Skip write can efficiently write the write data in a case where the interval is shorter than the interval of the free spaces where the write operation based on reordering can be executed.

After the processing in B706, the MPU 60 executes particular processing blocks (B605 to B610) and ends the write operation.

According to the modified example, the magnetic disk device 1 can select the write operation by detecting the status of the free space in the media cache area 112. Consequently, the magnetic disk device 1 can prevent degradation of the write performance depending on the write operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device, comprising:
   a disk comprising a first region and a second region;
   a head configured to record write data to the disk;
   a buffer configured to store the write data input from outside up to a first capacity; and
   a controller circuitry configured to obtain a first processing amount based on a time to write the write data from the buffer to the first region by the head and a second processing amount improved by writing the write data from the buffer to the first region, compare the first processing amount with the second processing amount, and determine whether the write data should be written from the buffer to the first region, based on a result of the comparison between the first processing amount and the second processing amount, wherein the controller circuitry writes the write data from the buffer to the second region if the controller circuitry does not write the write data from the buffer to the first region.

2. The magnetic disk device of claim 1, wherein the controller circuitry obtains the first processing amount by referring to a first table indicating a relationship between the first processing amount and the time to write the write data to the first region, and obtains the second processing amount by referring to a second table indicating a relationship between a capacity of the buffer and a write count per unit time.

3. The magnetic disk device of claim 2, wherein the controller circuitry obtains a third processing amount based on the first processing amount and a fourth processing amount based on a second capacity less than the first capacity by referring to the second table, and obtains the second processing amount from a difference between the fourth processing amount and the third processing amount.

4. The magnetic disk device of claim 1, wherein the controller circuitry writes the write data to the first region if the first processing amount is less than the second processing amount.

5. The magnetic disk device of claim 1, wherein the controller circuitry writes the write data to the second region if the first processing amount is greater than the second processing amount.

6. The magnetic disk device of claim 1, wherein the controller circuitry selects the write operation to be executed in response to a status of a free space in the first region.

7. The magnetic disk device of claim 6, wherein the controller circuitry executes a sequential write operation if the free space comprises a capacity by which the write data can be sequentially written.

8. The magnetic disk device of claim 6, wherein if the free space is less than a capacity by which the write data can be sequentially written and is formed of a plurality of regions disposed at intervals less than an interval in which the write data can be written after changing an order of writing the write data in accordance with a physical position of the disk, the controller circuitry sequentially writes the write data to the first region at each particular interval less than the interval in which the write data can be written after changing the order of writing the write data in accordance with the physical position of the disk.

9. The magnetic disk device of claim 6, wherein if the free space is less than a capacity by which the write data can be sequentially written and is formed of a plurality of regions disposed at intervals less than an interval in which the write data can be written after changing an order of writing the write data in accordance with a physical position of the disk, the controller circuitry executes the write operation by reordering.

10. The magnetic disk device of claim 1, further comprising a nonvolatile memory,
wherein the first capacity is a capacity based on a capacity of the nonvolatile memory and a capacity of the first region.

11. A method of controlling a write operation applied to a magnetic disk device comprising a disk comprising a first region and a second region, and a buffer which stores the write data input from outside up to a first capacity, the method comprising:

obtaining a first processing amount based on a time to write the write data from the buffer to the first region and a second processing amount improved by writing the write data from the buffer to the first region;

comparing the first processing amount with the second processing amount; and determining whether the write data should be written to the first region, based on a result of the comparison between the first processing amount and the second processing amount wherein if the write data is not written from the buffer to the first region, the write data is written from the buffer to the second region.

12. The method of claim 11, wherein the obtaining comprises obtaining the first processing amount by referring to a first table indicating a relationship between the first processing amount and the time to write the write data to the first region, and obtaining the second processing amount by referring to a second table indicating a relationship between a capacity of the buffer and a write count per unit time.

13. The method of claim 12, further comprising obtaining a third processing amount based on the first processing amount and a fourth processing amount based on a second capacity less than the first capacity are obtained by referring to the second table, and the second processing amount is obtained from a difference between the fourth processing amount and the third processing amount.

14. The method of claim 11, wherein
the write data is written to the first region if the first processing amount is less than the second processing amount.

15. The method device of claim 11, wherein
the write data is written to the second region if the first processing amount is greater than the second processing amount.

16. The method of claim 11, wherein
the write operation to be executed is selected in response to a status of a free space in the first region.

17. The method of claim 16, wherein
a sequential write operation is executed if the free space comprises a capacity by which the write data can be sequentially written.

18. The method of claim 16, wherein
if the free space is less than a capacity by which the write data can be sequentially written and is formed of a plurality of regions disposed at intervals less than an interval in which the write data can be written after changing an order of writing the write data in accordance with a physical position of the disk, the write operation is executed by reordering.

* * * * *